US008819851B1

(12) United States Patent
Johansson

(10) Patent No.: US 8,819,851 B1
(45) Date of Patent: Aug. 26, 2014

(54) ACCESS CONTROL USING SOCIAL NETWORK ASSOCIATIONS

(71) Applicant: Olof Johansson, Belmont, CA (US)

(72) Inventor: Olof Johansson, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/663,280

(22) Filed: Oct. 29, 2012

(51) Int. Cl.
G06F 1/26 (2006.01)
H04L 29/06 (2006.01)

(52) U.S. Cl.
CPC ............ H04L 63/0428 (2013.01); H04L 63/08 (2013.01); H04L 63/061 (2013.01)
USPC .......................................................... 726/28

(58) Field of Classification Search
CPC ..................... H04L 63/0428; H04L 63/08
USPC ........................................ 726/28; 713/170
See application file for complete search history.

(56) References Cited

U.S. PATENT DOCUMENTS

| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |

(Continued)

FOREIGN PATENT DOCUMENTS

WO WO0279984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

Primary Examiner — Teshome Hailu
Assistant Examiner — Abiy Getachew
(74) Attorney, Agent, or Firm — Patent Law Works LLP

(57) ABSTRACT

The disclosure includes a system and method for performing access control. The system includes a controller, an authentication module and a permission module. The controller receives an access request from a first user. The access request indicates a request to access a cloud-based service managed by a second user. The authentication module authenticates the first user. The permission module determines a first social network association that exists between the first user and the second user based at least in part on a social graph and determines whether access to the cloud-based service is permitted for the first social network association based at least in part on an access setting of the cloud-based service. Responsive to determining that the access is permitted for the first social network association, the permission module generates access permission data to permit the first user to access the cloud-based service.

20 Claims, 6 Drawing Sheets

(56) References Cited

U.S. PATENT DOCUMENTS

| | | | |
|---|---|---|---|
| 2008/0056475 | A1 | 3/2008 | Brannick et al. |
| 2008/0192656 | A1 | 8/2008 | Vagelos |
| 2011/0098156 | A1 | 4/2011 | Ng et al. |
| 2012/0158751 | A1* | 6/2012 | Tseng .................. 707/751 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

ACCESS CONTROL USING SOCIAL NETWORK ASSOCIATIONS

BACKGROUND

The specification relates to system access control. In particular, the specification relates to controlling access to a cloud-based service. A cloud-based service includes one or more of a web service, an application and an operating system.

Cloud computing technology delivers computing power and storage capacity as a service to a community of user devices via a network. Application and data are stored on a cloud server. A user device accesses the applications and data using a client that stores and executes a browser application.

SUMMARY

According to one innovative aspect of the subject matter described in this disclosure, a system for controlling access to a cloud-based service includes: a controller for receiving an access request from a first user, the access request indicating a request to access a cloud-based service managed by a second user; an authentication module for authenticating the first user responsive to receiving the access request; and a permission module for determining a first social network association that exists between the first user and the second user based at least in part on a social graph, the permission module determining whether access to the cloud-based service is permitted for the first social network association based at least in part on an access setting of the cloud-based service, and responsive to determining that the access is permitted for the first social network association, the permission module generating access permission data to permit the first user to access the cloud-based service.

In general, another innovative aspect of the subject matter described in this disclosure may be embodied in methods that include: receiving an access request from a first user, the access request indicating a request to access a cloud-based service managed by a second user; authenticating the first user responsive to receiving the access request; determining a first social network association that exists between the first user and the second user based at least in part on a social graph; determining whether access to the cloud-based service is permitted for the first social network association based at least in part on an access setting of the cloud-based service; and responsive to determining that the access is permitted for the first social network association, generating access permission data to permit the first user to access the cloud-based service.

Other aspects include corresponding methods, systems, apparatus, and computer program products for these and other innovative aspects.

These and other implementations may each optionally include one or more of the following features. For instance, the operations include: determining an access mode for the first user to access the cloud-based service based at least in part on the first social network association and the access setting; receiving configuration data from the second user; and configuring the access setting for the cloud-based service based at least in part on the configuration data. For instance, the features include: the access setting specifying one or more social network associations permitted to access the cloud-based service; determining whether the first social network association is included in the one or more social network associations specified in the access setting; responsive to determining that the first social network association is included in the one or more social network associations, permitting the first user to access the cloud-based service; the cloud-based service as a cloud-based web service, a cloud-based application or a cloud-based operating system; and the access setting including a whitelist of users permitted to access the cloud-based service.

The present disclosure may be particularly advantageous in a number of respects. First, the system allows an administrator of a cloud-based service to configure access control for the cloud-based service based at least in part on social network associations in a social network. Second, the system performs access control for the cloud-based service based on social network associations and determines different access modes for different users based on different social network associations between the administrator and the users. Third, the system provides dynamic access control to the cloud-based service. For example, assume an administrator allows friends in a social network to access a cloud-based service. If the administrator adds new friends in the social network, the system will provide dynamic access control to the cloud-based service by automatically allowing the new friends to access the cloud-based service. If the administrator deletes a set of friends in the social network, the system will automatically block the deleted set of friends from accessing the cloud-based service.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
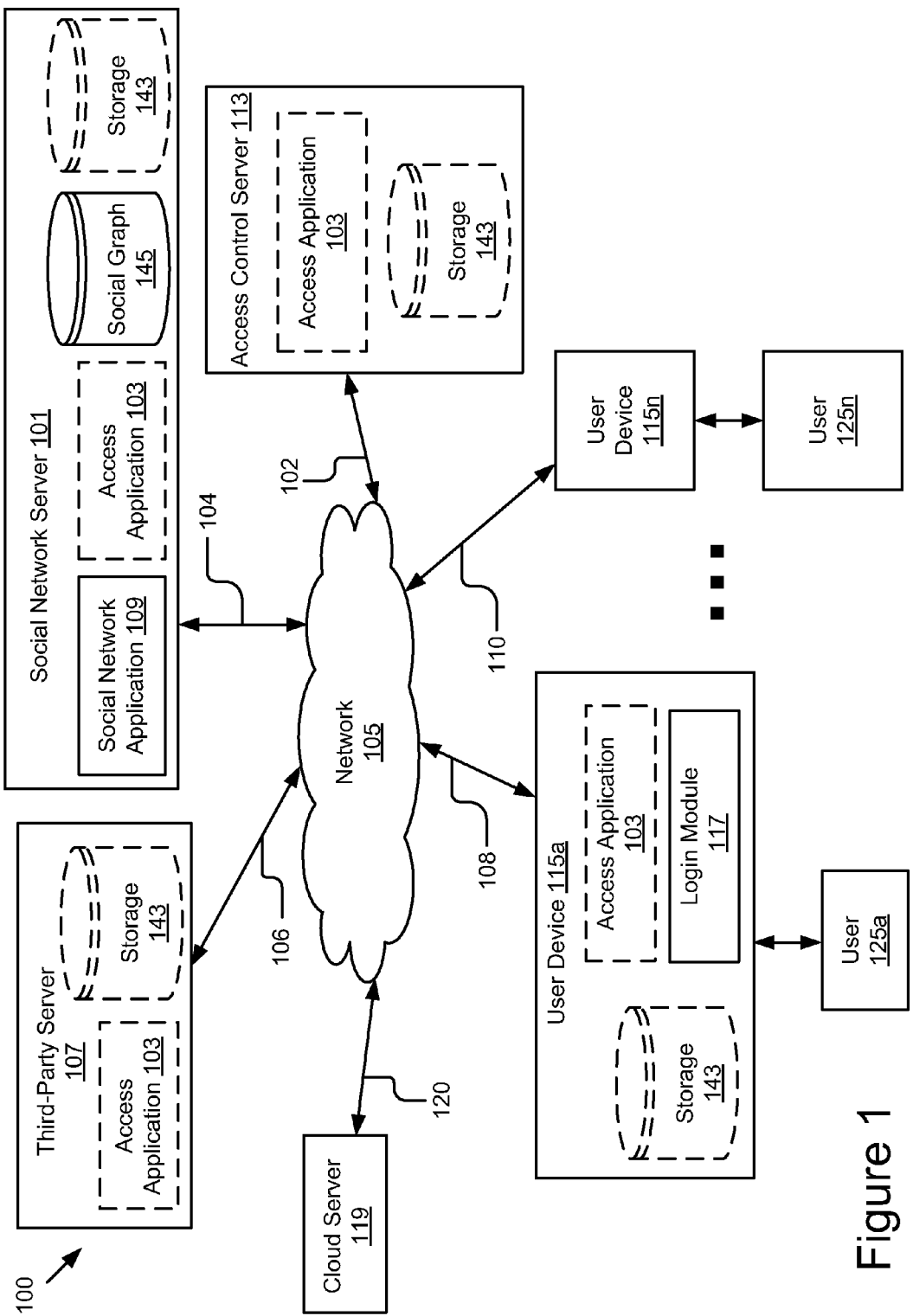
FIG. 1 is a block diagram illustrating an example system for controlling access to a cloud-based service.

FIG. 1 illustrates a block diagram of some implementations of a system 100 for controlling access to a cloud-based service. A cloud-based service includes one or more of a web service, an application and an operating system.

For implementations in which the cloud-based service is a web service, the web service can be any service accessed by a user device 115 via the network 105. For example, the web service is any service stored and executed by the cloud server 119.

For implementations in which the cloud-based service is an application, the application can be any web application accessed by a user device 115 via the network 105. For example, the web service is any web application stored and executed by the cloud server 119.

For implementations in which the cloud-based service is an operating system, the operating system can be any browser-based operating system. In some implementations the operating system is a browser-based operating system operable on a user device 115 and the only application on the user device is a browser incorporating a file manager. In some implementations the browser incorporates a media player. In some implementations the operating system is based on Linux. In some implementations the operating system is not browser-based. For example, the operating system is a conventional graphical interface operating system.

The illustrated system 100 includes user devices 115a . . . 115n that can be accessed by users 125a . . . 125n, a social network server 101, a third-party server 107, an access control server 113 and a cloud server 119. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated implementation, these entities of the system 100 are communicatively coupled via a network 105.

The user devices 115a, 115n in FIG. 1 are used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the third-party server 107, the cloud server 119 and the access control server 113, in practice one or more networks 105 can be connected to these entities.

In some instances, the access application 103 may be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the access control server 113, the cloud server 119 and the third-party server 107 via the network 105. The social network server 101 includes a social network application 109, a social graph 145 and an optional storage device 143. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

In some instances, the access application 103 may be stored on a third-party server 107, which is connected to the network 105 via signal line 106. In some implementations, the third-party server 107 can be a hardware server that includes a processor, a memory and network communication capabilities. Optionally, the third-party server 107 includes a storage device 143. The third-party server 107 sends and receives data to and from other entities of the system 100 via the network 105. While FIG. 1 includes one third-party server 107, the system 100 may include one or more third-party servers 107.

In some instances, the access application 103 may be stored on an access control server 113, which is connected to the network 105 via signal line 102. In some implementations, the access control server 113 can be a hardware server that includes a processor, a memory and network communication capabilities. Optionally, the access control server 113 includes a storage device 143. The access control server 113 sends and receives data to and from other entities of the system 100 via the network 105. While FIG. 1 includes one access control server 113, the system 100 may include one or more access control servers 113.

In some instances, the access application 103 may be stored on a user device 115a, which is connected to the network 105 via signal line 108. In some implementations, the user device 115a, 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user 125a interacts with the user device 115a. The user device 115n is communicatively coupled to the network 105 via signal line 110. The user 125n interacts with the user device 115n. In some instances, the access application 103 acts in part as a thin-client application that may be stored on the user devices 115a, 115n and in part as components that may be stored on one or more of the social network server 101, the access control server 113 and the third-party server 107. In the illustrated implementation, the user device 115a additionally includes a login module 117 and an optional storage device 143.

The access application 103 can be code and routines for controlling access to a cloud-based service. In some instances, the access application 103 can be implemented using hardware including a field-programmable gate array (FPGA) or an application-specific integrated circuit (ASIC). In some other instances, the access application 103 can be implemented using a combination of hardware and software. In some instances, the access application 103 may be stored in a combination of the devices and servers, or in one of the devices or servers.

In some instances, the access application 103 receives configuration data from a user and configures an access setting for an cloud-based service using the configuration data. The access application 103 controls access to the cloud-based service based at least in part on the access setting.

In some implementations, the access application 103 controls offline access to a cloud-based service that is an operating system running on a local device (e.g., a user device 115). In some other instances, the access application 103 controls online access to a cloud-based service that is an operating system running on the cloud (e.g., a cloud server 119).

In some implementations, the access application 103 configures access control to a cloud-based service by setting different restrictions (e.g., different access control lists) for different user devices 115 that access the cloud-based service. For example, the access application 103 configures access restrictions (e.g., access settings, access mode, etc.) for each user device 115 separately. In some implementations, the access application 103 implements access control based on a white list. In some implementations the access application 103 implements access control based on a black list. In some implementations the access application 103 implements access control based on social network associations. The access application 103 is described below in more detail with reference to FIGS. 2-5B.

The login module 117 can be code and routines for assisting a user to log in to an cloud-based service. For example, the login module 117 generates graphical data for providing a user interface to a user, allowing the user to input a login identifier (ID) (e.g., a user name, an email address, etc.) and a login credential (e.g., a password) via the user interface. In some instances, the login module 117 receives a login request from a user and sends the login request to the access application 103. In some implementations, the login request includes a login ID and a login credential associated with a user who requests to log in a cloud-based service. In some instances, the login module 117 receives access permission data from the access application 103 and permits the user to log in the cloud-based service responsive to receiving the access permission data. The access permission data is described below in more detail with reference to FIG. 2.

The storage device 143 can be a non-transitory memory that stores data for providing the functionality described herein. The storage device 143 may be a dynamic random access memory (DRAM) device, a static random access memory (SRAM) device, flash memory or some other memory devices. In some instances, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 143 is described below in more detail with reference to FIG. 2.

The cloud server 119 can be a hardware server that includes a processor, a memory and network communication capabilities. In the illustrated implementation, the cloud server 119 is communicatively coupled to the network 105 via signal line 120. In some instances, the cloud server 119 provides cloud-based services (e.g., cloud-based applications, platforms, etc.) to users operating on user devices 115 and stores data for the users in a cloud storage (not pictured). In some instances, a user accesses cloud-based services provided by the cloud server 119 via a browser or an application stored on a user device 115.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some instances, the network 105 may be a peer-to-peer network. The network 105 may also be coupled to or includes portions of a telecommunications network for sending data in a variety of different communication protocols. In some instances, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
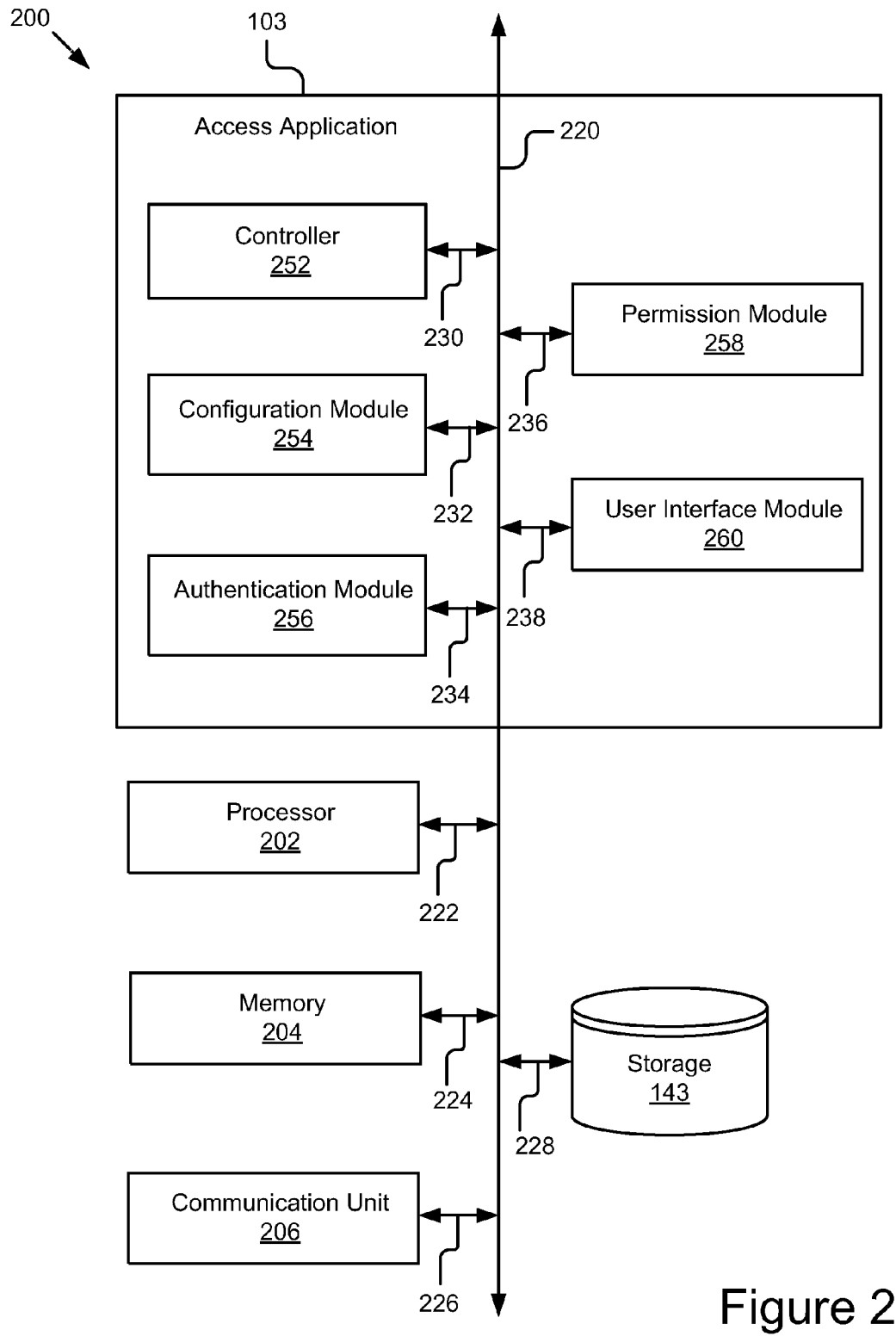
FIG. 2 is a block diagram illustrating an example of an access application.

Referring now to FIG. 2, an example of the access application 103 is shown in more detail. FIG. 2 is a block diagram of a computing device 200 that includes an access application 103, a processor 202, a memory 204, a communication unit 206 and a storage device 143 according to some examples. The components of the computing device 200 are communicatively coupled by a bus 220. In some instances, the computing device 200 can be one of a social network server 101, a user device 115, an access control server 113 and a third-party server 107.

The processor 202 includes an arithmetic logic unit, a microprocessor, a general purpose controller or some other processor array to perform computations and provide electronic display signals to a display device. The processor 202 is coupled to the bus 220 for communication with the other components via signal line 222. Processor 202 processes data signals and may include various computing architectures including a complex instruction set computer (CISC) architecture, a reduced instruction set computer (RISC) architecture, or an architecture implementing a combination of instruction sets. Although FIG. 2 includes a single processor 202, multiple processors 202 may be included. Other processors, operating systems, sensors, displays and physical configurations are possible.

The memory 204 stores instructions and/or data that may be executed by the processor 202. The memory 204 is coupled to the bus 220 for communication with the other components via signal line 224. The instructions and/or data may include code for performing the techniques described herein. The memory 204 may be a dynamic random access memory (DRAM) device, a static random access memory (SRAM) device, flash memory or some other memory device. In some instances, the memory 204 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 206 transmits and receives data to and from at least one of the user device 115, the third-party server 107, the access control server 113 and the social network server 101 depending upon where the access application 103 may be stored. The communication unit 206 is coupled to the bus 220 via signal line 226. In some instances, the communication unit 206 includes a port for direct physical connection to the network 105 or to another communication channel. For example, the communication unit 206 includes a USB, SD, CAT-5 or similar port for wired communication with the user device 115. In some instances, the communication unit 206 includes a wireless transceiver for exchanging data with the user device 115 or other communication channels using one or more wireless communication methods, including IEEE 802.11, IEEE 802.16, BLUETOOTH® or another suitable wireless communication method.

In some instances, the communication unit 206 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 206 includes a wired port and a wireless transceiver. The communication unit 206 also provides other conventional connections to the network 105 for distribution of files and/or media objects using standard network protocols including TCP/IP, HTTP, HTTPS and SMTP, etc.

In the illustrated implementation, the storage device 143 is communicatively coupled to the bus 220 via signal line 228. In some instances, the storage device 143 stores data describing one or more access settings for a cloud-based service. An access setting may be data describing an access configuration for the cloud-based service. For example, an access setting includes one or more social network associations of a user (e.g., a user's friends, family members and/or acquaintance in a social network) that are allowed to access the cloud-based service. Other examples of an access setting include, but are not limited to, one or more access control lists (e.g., a whitelist of users who may access the operating system, a blacklist, etc.), a specific domain (e.g., an email address domain) from which access is allowed and an anonymous access to the cloud-based service for a guest.

In some instances, the storage device 143 stores data describing one or more access modes. In some implementations, an access mode may also be included in an access setting. An access mode may include data describing an access level for a user. For example, an access mode may be one of an anonymous access mode for a guest which allows a guest to access a set of pre-determined features of the cloud-based service, a restricted access mode which allows a user to access a restricted version of the cloud-based service, a customized access mode for a specific type of social network association (e.g., an access mode including features customized for family members or friends, etc.) and a full access mode which allows a user to access a complete version of the cloud-based service.

In some instances, the storage 143 stores user profile data describing one or more user profiles upon the consent of users. For example, the storage 143 stores login IDs and login credentials for users who may be permitted to log in the cloud-based service. In another example, the storage 143 stores social network accounts for users connected with an administrator of a cloud-based service via a social network.

In the illustrated implementation shown in FIG. 2, the access application 103 includes a controller 252, a configuration module 254, an authentication module 256, a permission module 258 and a user interface module 260. These components of the access application 103 are communicatively coupled to each other via the bus 220.

The controller 252 can be software including routines for handling communications between the access application 103 and other components of the computing device 200. In some instances, the controller 252 can be a set of instructions executable by the processor 202 to provide the functionality described below for handling communications between the access application 103 and other components of the computing device 200. In some other instances, the controller 252 can be stored in the memory 204 of the computing device 200 and can be accessible and executable by the processor 202. The controller 252 may be adapted for cooperation and communication with the processor 202 and other components of the computing device 200 via signal line 230.

The controller 252 sends and receives data, via the communication unit 206, to and from one or more of a user device 115, an access control server 113, a social network server 101 and a third-party server 107. For example, the controller 252 receives, via the communication unit 206, an access request from a user device 115 and sends the access request to the authentication module 256. In another example, the controller 252 receives graphical data for providing a user interface to a user from the user interface module 260 and sends the graphical data to a user device 115, causing the user device 115 to present the user interface to the user.

In some instances, the controller 252 receives data from components of the access application 103 and stores the data in the storage device 143. For example, the controller 252 receives data describing one or more access settings from the configuration module 254 and stores the data in the storage device 143. In some instances, the controller 252 retrieves data from the storage device 143 and sends the data to components of the access application 103. For example, the controller 252 retrieves data describing access settings from the storage device 143 and sends the data to the permission module 258.

The configuration module 254 can be software including routines for configuring access settings for a cloud-based service. In some instances, the configuration module 254 can be a set of instructions executable by the processor 202 to provide the functionality described below for configuring access settings for a cloud-based service. In some other instances, the configuration module 254 can be stored in the memory 204 of the computing device 200 and can be accessible and executable by the processor 202. The configuration module 254 may be adapted for cooperation and communication with the processor 202 and other components of the computing device 200 via signal line 232.

In some instances, the configuration module 254 receives, via the controller 252, configuration data for configuring access to a cloud-based service from a user operating on a user device 115 (e.g., an administrator of an operating system that is the cloud-based service). The configuration module 254 configures the access setting for the cloud-based service based at least in part on the received configuration data. For example, the configuration module 254 receives configuration data describing one or more followers who follow an administrator of the cloud-based service in a social network. The configuration module 254 configures an access setting for the cloud-based service which allows the one or more followers to access the cloud-based service using a user device 115 operated by the administrator.

In some instances, the configuration module 254 receives data describing a type of social network association from an administrator. The configuration module 254 generates an access setting that permits other users connected to the administrator via the type of social network association to access the cloud-based service. For example, the configuration module 254 receives data identifying a friendship social network association from an administrator, and generates an access setting that authorizes friends of the administrator in a social network to access the cloud-based service. In another example, the configuration module 254 receives data indicating that an administrator allows friends of friends in a social network to access the cloud-based service. The configuration module 254 generates an access setting that permits other users who may be the administrator's friends of friends to access the cloud-based service.

In some instances, the configuration module 254 receives data describing one or more of a whitelist, a specific domain and a specific group of users, etc., from an administrator and generates an access setting that permits other users from one of the whitelist, the specific domain and the specific group to access the cloud-based service. In some other instances, the configuration module 254 generates an access setting that permits other users to access the cloud-based service using an anonymous guest account.

In some instances, the configuration module 254 stores the access setting in the storage 143. In some other instances, the configuration module 254 sends the access setting to the permission module 258.

The authentication module 256 can be software including routines for authenticating a user. In some instances, the authentication module 256 can be a set of instructions executable by the processor 202 to provide the functionality described below for authenticating a user. In some other instances, the authentication module 256 can be stored in the memory 204 of the computing device 200 and can be accessible and executable by the processor 202. The authentication module 256 may be adapted for cooperation and communication with the processor 202 and other components of the computing device 200 via signal line 234.

In some instances, the authentication module 256 receives, via the controller 252 and the communication unit 206, an access request to access a cloud-based service from a user. In some implementations, the access request may be a request from a user to access a cloud-based service using a user device 115 managed by the administrator. In some implementations, the user operates on the administrator's user device 115 directly. In some other implementations, the user operates on another user device 115 which may be remotely connected to the administrator's user device 115. The access request includes a login ID and a login credential associated with the user. In some implementations, the login ID and the login credential may be a user name and a password that the user registers with one of the cloud-based service, a social network provided by the social network server 101 and a third-party social network provided by a third-party server 107 (e.g., a third-party social network server).

In some instances, the authentication module 254 determines whether the user may be included in a blacklist. If the user may be included in a blacklist, the authentication module 254 instructs the permission module 258 to deny the access of the user to the cloud-based service. If the user may not be included in a blacklist, the authentication module 254 authenticates the user. The authentication module 256 determines whether the authentication of the user succeeds. For example, the authentication module 254 cross-references the login ID and the login credential with user profile data stored in the storage 143 and determines whether a match of the login ID and the login credential can be found in the storage 143. In another example, the login request includes a user name and a password registered with a social network. The authentication module 256 sends the user name and the password to the social network application 109 and instructs the social network application 109 to authenticate the user. The authentication module 256 receives an authentication confirmation signal from the social network application 109 if the authentication succeeds. An authentication confirmation signal indicates that the authentication of the user succeeds.

In some instances, the login request includes a user name and a password registered with a third-party social network. The authentication module 256 sends the login request to a third-party social network server for authentication. For example, the authentication module 256 sends the user name and the password to a trusted third-party server 107 which performs authentication for the user. The authentication module 256 receives an authentication confirmation signal from the third-party server 107 if the authentication succeeds.

In some instances, a user lists identification data (e.g., a primary email address) as user profile data stored in the third-party server 107. The identification data may be mapped to a primary credential used in the social network server 101. The authentication module 256 authenticates the user using the identification data listed in the third-party server 107 by mapping the identification data to the primary credential. For example, a third-party server 107 receives a login request including a user name and a password registered with a third-party social network from the authentication module 256, and authenticates the user using the user name and the password. After authentication, the third-party server 107 provides the user's primary email address listed in the user profile to the authentication module 256. The authentication module 256 authenticates the user using the primary email address, since the primary email address may be a user name that the user registers with the social network server 101. For example, the authentication module 256 sends an authentication email to the user's primary email address. The authentication email includes a link for authenticating the user. If the user clicks on the link, an authentication confirmation signal may be sent to the authentication module 256.

If the authentication of the user succeeds, the authentication module 256 sends an authentication confirmation signal to the permission module 258. However, if the authentication of the user fails (e.g., the login credential does not match to the login ID, no match of the login ID and login credential can be found in a storage 143, etc.), the authentication module 256 generates a denial signal and instructs the permission module 258 to deny the access of the user to the cloud-based service.

The permission module 258 can be software including routines for permitting a user to access the cloud-based service. In some instances, the permission module 258 can be a set of instructions executable by the processor 202 to provide the functionality described below for permitting a user to access a cloud-based service. In some other instances, the permission module 258 can be stored in the memory 204 of the computing device 200 and can be accessible and executable by the processor 202. The permission module 258 may be adapted for cooperation and communication with the processor 202 and other components of the computing device 200 via signal line 236.

In some instances, the permission module 258 receives a denial signal from the authentication module 256 and denies a user identified in the denial signal to access a cloud-based service. In some other instances, the permission module 258 receives an authentication confirmation signal from the authentication module 256. The permission module 258 determines whether the authenticated user may be permitted to access the cloud-based service responsive to receiving the authentication confirmation signal. For example, the permission module 258 determines one or more of: whether the user may be included in a whitelist; whether the user may be from a specific domain authorized to access the cloud-based service; and whether an anonymous access mode may be activated for the cloud-based service.

In some instances, the permission module 258 determines whether the user may be connected to the administrator of the cloud-based service in a social network. For example, the permission module 258 determines a type of social network association between the user and the administrator based at least in part on a social graph of the social network. As a further example, the permission module 258 determines whether the user may be connected to the administrator of the cloud-based service as a friend, a family member, a coworker, a friend of friend, acquaintance, etc. In some instances, the social network association between the user and the administrator may be an association in a social network provided by the social network server 101. In some other instances, the social network association may be an association in a third-party social network provided by a third-party server 107 (e.g., a third-party social network server).

The permission module 258 determines whether access to the cloud-based service may be permitted for the determined type of social network association based at least in part on an access setting for the cloud-based service. In some instances, the access setting specifies one or more types of social network associations permitted to access the cloud-based service. The permission module 258 determines whether the determined type of social network association may be included in the one or more types of social network associations specified in the access setting. If the determined type of social network association may be included in the one or more types of social network associations, the permission module 258 permits the user to access the cloud-based service. For example, assume a user connects to an administrator of an o cloud-based service as a friend in a social network. If an access setting allows friends of the administrator to access the cloud-based service, the permission module 258 determines that permission to access the cloud-based service may be granted to the user.

After permitting the user to access to the cloud-based service, the permission module 258 optionally determines an access mode for the user. For example, the permission module 258 determines that the user may access the cloud-based service in one of an anonymous access mode, a restricted access mode, a customized access mode and a full access mode, etc. In some instances, the permission module 258 determines the access mode for the user based at least in part on an access setting. For example, if an access setting describes a whitelist including the user, the permission module 258 determines a full access mode for the user.

In some instances, the permission module 258 determines an access mode for the user based at least in part on one or more of the access setting and the type of social network association between the user and the administrator. For example, assume the type of social network association indicates that the user may be a family member of the administrator. An access setting indicates that family members may be allowed to access the cloud-based service without restriction. As a result, the permission module 258 determines a full access mode for the user. However, if the type of social network association indicates that the user may be a friend of friend and an access setting indicates that access to the cloud-based service may be limited for non-family members, the permission module 258 determines a restricted access mode for the user.

In some instances, the permission module 258 generates access permission data for the user after permitting the user to access the cloud-based service. In some implementations, the access permission data indicates that the user may be permitted to access the cloud-based service in the determined access mode. In some implementations, the access permission data may be an authentication token that allows the user to access the cloud-based service. The permission module 258 sends the access permission data to the login module 117, causing the login module 117 to allow the user to access the cloud-based service in the determined access mode.

On the other hand, if access to the cloud-based service may not be permitted for the user, the permission module 258 denies the user to access the cloud-based service. For example, the permission module 258 generates a signal indicating that permission to access the cloud-based service may not be granted for the user and sends the signal to the login module 117, causing the login module 117 to block the user from accessing the cloud-based service.

The user interface module 260 can be software including routines for generating graphical data for providing user interfaces to users. In some instances, the user interface module 260 can be a set of instructions executable by the processor 202 to provide the functionality described below for generating graphical data for providing user interfaces to users. In some other instances, the user interface module 260 can be stored in the memory 204 of the computing device 200 and can be accessible and executable by the processor 202. The user interface module 260 may be adapted for cooperation and communication with the processor 202 and other components of the computing device 200 via signal line 238.

In some instances, the user interface module 260 generates graphical data for providing a user interface that depicts one or more options for configuring access control for a cloud-based service. The user interface module 260 sends the graphical data to a user device 115 operated by a user, causing the user device 115 to present the options to the user via the user interface. The user may configure access control for the cloud-based service via the user interface. The user interface module 260 may generate graphical data for providing other user interfaces to users.

As an example use of the access application 103, a first user specifies, via the configuration module 254, that friends in a friend circle may be allowed to access a cloud-based service managed by the first user. Upon receiving an access request from a second user, the authentication module 256 authenticates the second user by verifying a social network account and a password provided by the second user. If the authentication succeeds, the permission module 258 determines whether the second user may be a friend of the first user in a social network based at least in part on a social graph. The permission module 258 also determines whether friends in the friend circle may be allowed to access the cloud-based service based at least in part on an access setting. If the second user connects to the first user as a friend and friends in the friend circle may be permitted to access the cloud-based service, the permission module 258 generates an authentication token for the second user, which allows the second user to access the cloud-based service.

As another example use of the system, the access application 103 may be used by an organization to control access to an organization network. For example, the organization may specify that a list of employees and family members of the employees in a social network may be allowed to access the organization network. When a family member of an employee requests to access the organization network, access may be granted after authentication.

As yet another example use of the system, the access application 103 may be used by a school to share information with students and parents. For example, the school may specify that a student and parents as listed in a social network of the student may be allowed to access courses and grades associated with the student.

Figure 3:
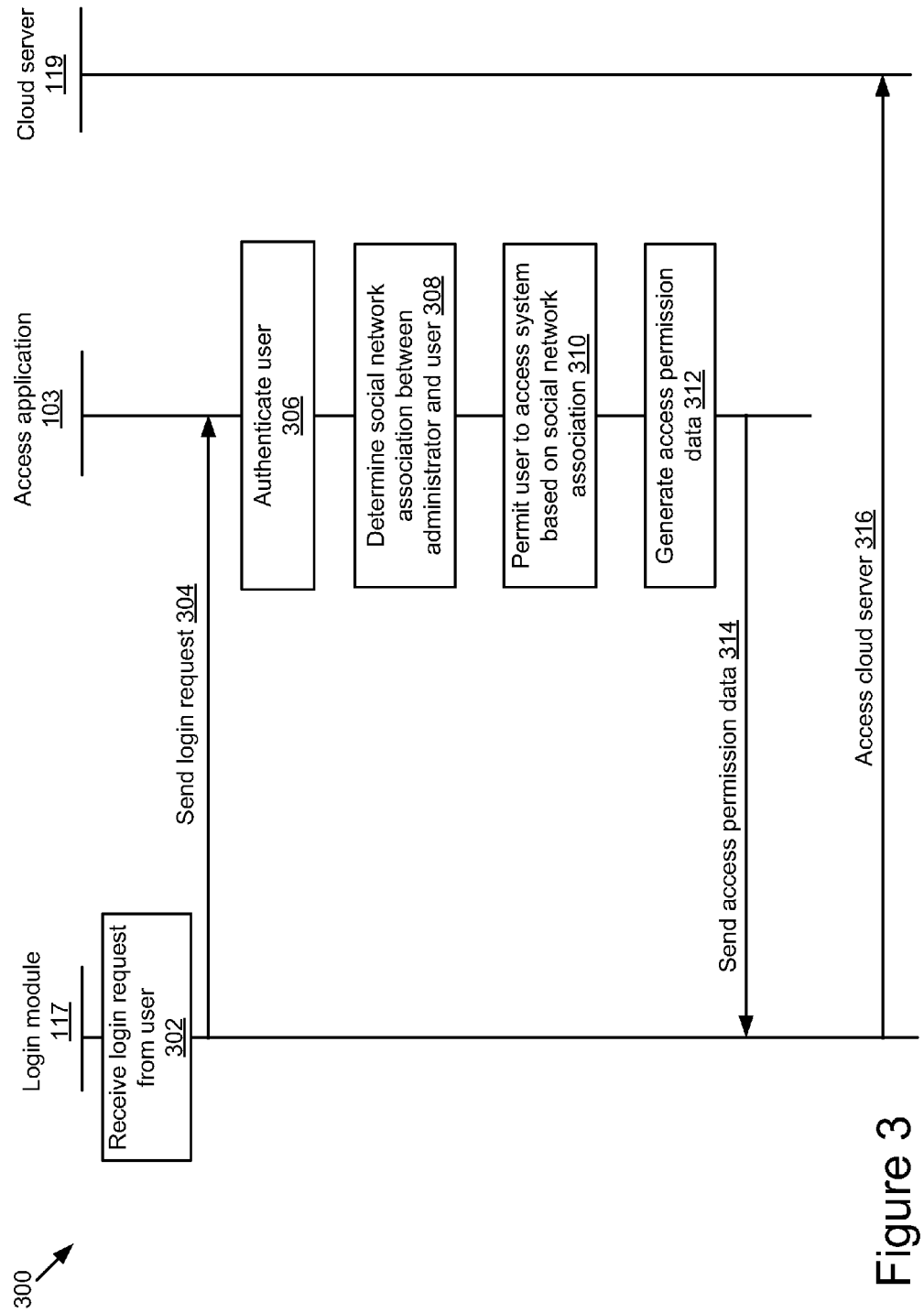
FIG. 3 is an event diagram illustrating an example process for performing system access control.

Referring now to FIG. 3, an example process 300 for performing system access control is described. In some implementations, the login module 117 receives 302 a login request from a user requesting to log in to a cloud-based service. The login module 117 sends 304 the login request to the access application 103. The access application 103 authenticates 306 the user responsive to receiving the login request. The access application 103 determines 308 a social network association between an administrator of the cloud-based service and the user. The access application 103 permits 310 the user to access the cloud-based service based at least in part on the determined social network association and an access setting for the cloud-based service. The access application 103 generates 312 access permission data (e.g., an authentication token) indicating that the user may be allowed to access the cloud-based service. The access application 103 sends 314 the access permission data to the login module 117. The login module 117 permits the user to access the cloud-based service responsive to receiving the access permission data. In some instances, the cloud-based service may be a cloud-based operating system and the login module 117 allows the user to access 316 the cloud server 119 responsive to receiving the access permission data.

Figure 4:
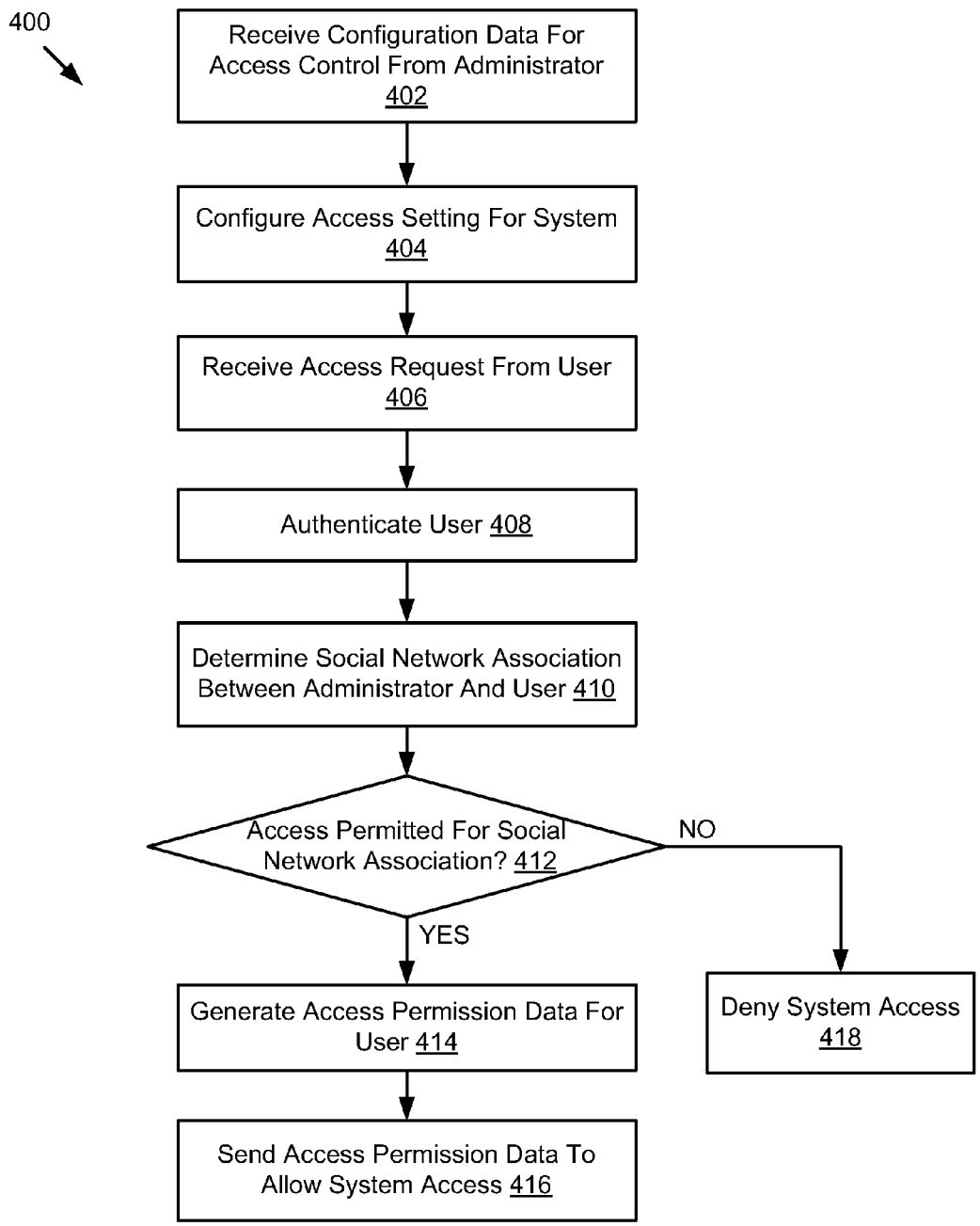
FIG. 4 is a flowchart of an example method for performing system access control.

Referring now to FIG. 4, an example of a method 400 for controlling access to a cloud-based service is described. In some instances, the controller 252 receives 402 configuration data for configuring access control to a cloud-based service from an administrator of the cloud-based service. The configuration module 254 configures 404 an access setting for the cloud-based service based at least in part on the configuration data. In some instances, the controller 252 receives 406 an access request to access the cloud-based service from a user. The authentication module 256 authenticates 408 the user responsive to receiving the access request. The permission module 258 determines 410 a social network association between the administrator and the user. The permission module 258 determines 412 whether access to the cloud-based service may be permitted for the social network association. If the access may be permitted, the permission module 258 generates 414 access permission data for the user and sends 416 the access permission data to the login module 117, which allows the user to access the cloud-based service. If the access may not be permitted, the permission module 258 denies 418 the system access for the user.

Figure 5A:
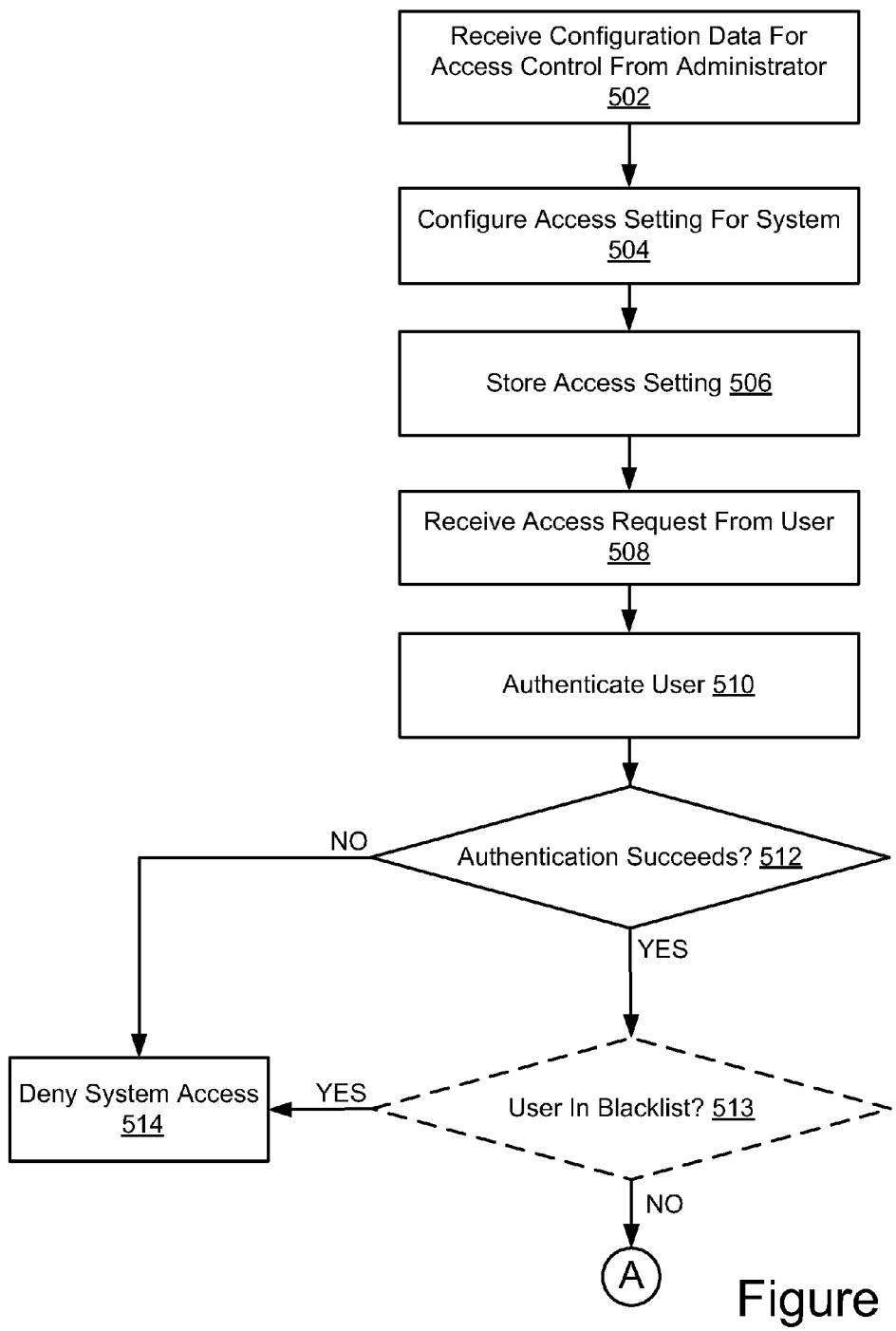
FIGS. 5A and 5B are flowcharts of another example method for performing system access control.
Figure 5B:
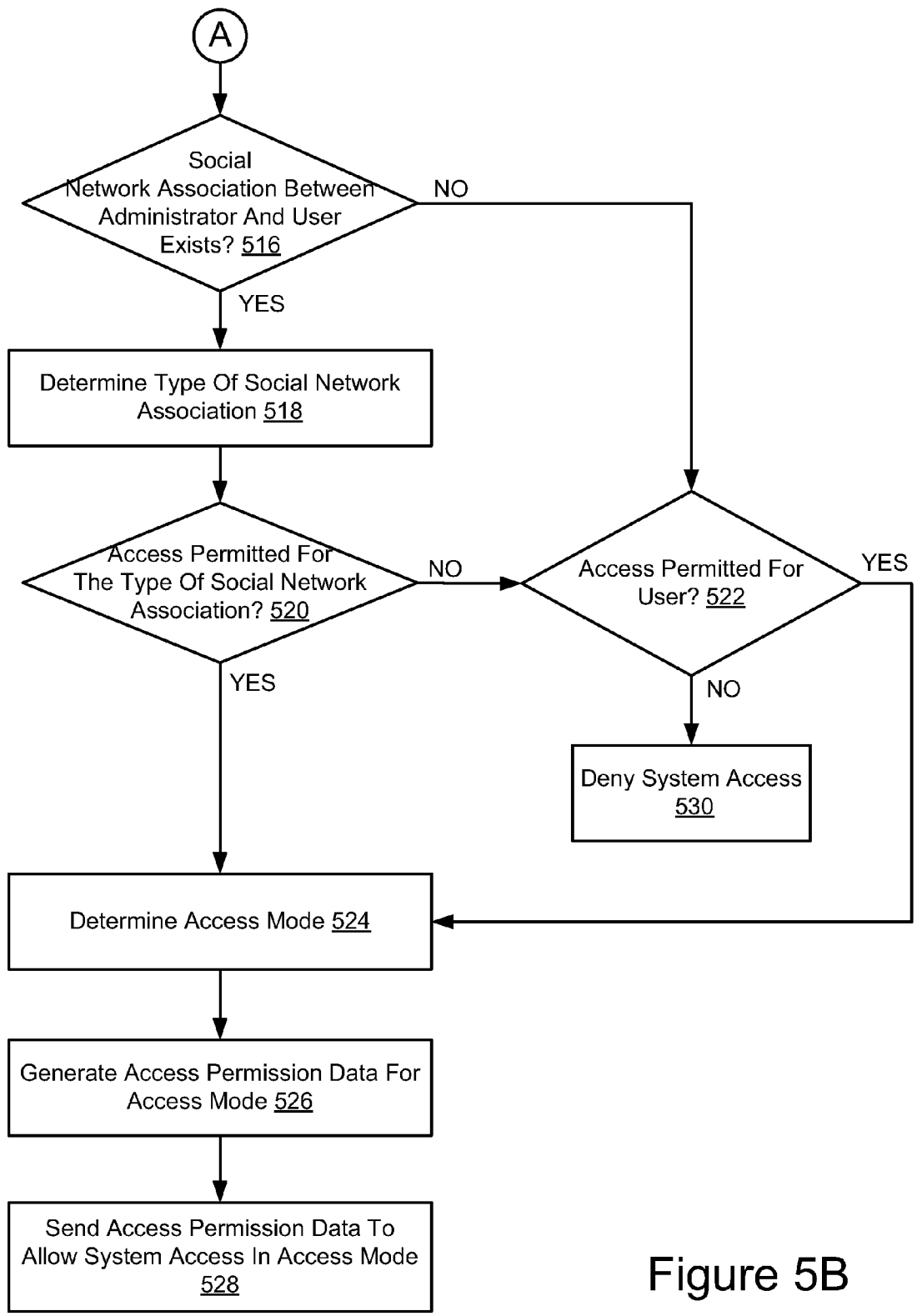

Referring now to FIGS. 5A and 5B, another example of a method 500 for controlling access to a cloud-based service is described. Turning to FIG. 5A, the controller 252 receives 502 configuration data for access control from an administrator of the cloud-based service. The configuration module 254 configures 504 an access setting for the cloud-based service based at least in part on the configuration data. The configuration module 254 stores 506 the access setting in the storage 143.

In some instances, the controller 252 receives 508 an access request from a user. The authentication module 256 authenticates 510 the user. The authentication module 256 determines 512 whether the authentication of the user succeeds. If the authentication fails, the permission module 258 denies 514 the user's access to the cloud-based service. If the authentication succeeds, the authentication module 256 optionally determines 513 whether the user may be included in a blacklist of the cloud-based service. In some instances, operation 513 may be performed before operation 510. If the user may be included in a blacklist, the permission module 258 denies 514 the user's access to the cloud-based service. Otherwise, the method 500 may move to perform operations described by FIG. 5B.

Referring to FIG. 5B, the permission module 258 determines 516 whether a social network association exists between the user and the administrator. If no social network association exists between the user and the administrator, the method 500 may move to operation 522. Otherwise, the permission module 258 determines 518 a type of social network association between the user and the administrator. The permission module 258 determines 520 whether access to the cloud-based service may be permitted for the type of social network association. If the access may be permitted for the type of social network association, the method 500 may move to operation 524. Otherwise, the method 500 may move to operation 522.

Turning to operation 522, the permission module 258 determines 522 whether access to the cloud-based service may be permitted for the user. For example, the permission module 258 determines whether the user may be included in a whitelist. If the access may be permitted for the user, the method 500 may move to operation 524. Otherwise, the permission module 258 denies 530 the user's access to the cloud-based service.

Turning to operation 524, the permission module 258 determines an access mode for the user. The permission module 258 generates 526 access permission data for the access mode and sends 528 the access permission data to the login module 117, causing the login module 117 to allow the user to access the cloud-based service in the access mode.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    receiving an access request a first user through a social networking service, the access request indicating a request to access a different cloud-based service managed by a second user;
    authenticating the first user responsive to receiving the access request;
    determining a first social network association that exists between the first user and the second user based at least in part on a social graph;
    determining whether access to the cloud-based service is permitted for the first social network association based at least in part on an access setting of the cloud-based service; and
    responsive to determining that the access is permitted for the first social network association, generating access permission data including an authentication token to permit the first user to access the cloud-based service.

2. The method of claim 1, further comprising:
    determining an access mode for the first user to access the cloud-based service based at least in part on the first social network association and the access setting.

3. The method of claim 1, wherein the access setting specifies one or more social network associations permitted to access the cloud-based service.

4. The method of claim 3, wherein determining whether the access to the cloud-based service is permitted for the first social network association comprises:
    determining whether the first social network association is included in the one or more social network associations specified in the access setting; and
    responsive to determining that the first social network association is included in the one or more social network associations, permitting the first user to access the cloud-based service.

5. The method of claim 1, further comprising:
    receiving configuration data from the second user; and
    configuring the access setting for the cloud-based service based at least in part on the configuration data.

6. The method of claim 1, wherein the cloud-based service is a cloud-based operating system.

7. The method of claim 1, wherein the access setting includes a whitelist of users permitted to access the operating system.

8. A computer program product comprising a non-transitory computer usable medium including a computer readable program, wherein the computer readable program when executed on a computer causes the computer to:
    receive an access request from a first user through a social networking service, the access request indicating a request to access a different cloud-based service managed by a second user;
    authenticate the first user responsive to receiving the access request;
    determine a first social network association that exists between the first user and the second user based at least in part on a social graph;
    determine whether access to the cloud-based service is permitted for the first social network association based at least in part on an access setting of the cloud-based service; and responsive to determining that the access is permitted for the first social network association, generate access permission data including an authentication token to permit the first user to access the cloud-based service.

9. The computer program product of claim 8, wherein the computer readable program when executed on the computer causes the computer to also:
determine an access mode for the first user to access the cloud-based service based at least in part on the first social network association and the access setting.

10. The computer program product of claim 8, wherein the access setting specifies one or more social network associations permitted to access the cloud-based service.

11. The computer program product of claim 10, wherein determining whether the access to the cloud-based service is permitted for the first social network association comprises:
determining whether the first social network association is included in the one or more social network associations specified in the access setting; and
responsive to determining that the first social network association is included in the one or more social network associations, permitting the first user to access the cloud-based service.

12. The computer program product of claim 8, wherein the computer readable program when executed on the computer causes the computer to also:
receive configuration data from the second user; and
configure the access setting for the cloud-based service based at least in part on the configuration data.

13. The computer program product of claim 8, wherein the cloud-based service is a cloud-based operating system.

14. The computer program product of claim 8, wherein the access setting includes a whitelist of users permitted to access the operating system.

15. A system comprising:
a controller for receiving an access request from a first user through a social networking service, the access request indicating a request to access a different cloud-based service managed by a second user;
an authentication module communicatively coupled to the controller, the authentication module authenticating the first user responsive to receiving the access request; and
a permission module communicatively coupled to the authentication module, the permission module determining a first social network association that exists between the first user and the second user based at least in part on a social graph, the permission module determining whether access to the cloud-based service is permitted for the first social network association based at least in part on an access setting of the cloud-based service, and responsive to determining that the access is permitted for the first social network association, the permission module generating access permission data including an authentication token to permit the first user to access the cloud-based service.

16. The system of claim 15, wherein the permission module is further configured to:
determine an access mode for the first user to access the cloud-based service based at least in part on the first social network association and the access setting.

17. The system of claim 15, wherein the access setting specifies one or more social network associations permitted to access the cloud-based service.

18. The system of claim 17, wherein the permission module is further configured to:
determine whether the first social network association is included in the one or more social network associations specified in the access setting; and
responsive to determining that the first social network association is included in the one or more social network associations, permit the first user to access the cloud-based service.

19. The system of claim 15, wherein the controller is configured to receive configuration data from the second user and further comprising:
a configuration module communicatively coupled to the controller, the configuration module configuring the access setting for the cloud-based service based at least in part on the configuration data.

20. The system of claim 15, wherein the cloud-based service is a cloud-based operating system.

* * * * *